United States Patent
Shi et al.

(10) Patent No.: US 10,348,887 B2
(45) Date of Patent: Jul. 9, 2019

(54) DOUBLE TALK DETECTION FOR ECHO SUPPRESSION IN POWER DOMAIN

(71) Applicant: OMNIVISION TECHNOLOGIES, INC., Santa Clara, CA (US)

(72) Inventors: Dong Shi, Singapore (SG); Chung-An Wang, Singapore (SG)

(73) Assignee: OmniVision Technologies, Inc., Santa Clara, CA (US)

( * ) Notice: Subject to any disclaimer, the term of this patent is extended or adjusted under 35 U.S.C. 154(b) by 81 days.

(21) Appl. No.: 15/494,146

(22) Filed: Apr. 21, 2017

(65) Prior Publication Data

US 2018/0309871 A1  Oct. 25, 2018

(51) Int. Cl.
   *H04B 3/23* (2006.01)
   *H04M 3/00* (2006.01)

(52) U.S. Cl.
   CPC .............. *H04M 3/002* (2013.01); *H04B 3/23* (2013.01)

(58) Field of Classification Search
   CPC .................................................. H04M 3/002
   USPC ............ 379/406.01, 406.08, 406.14, 413.01; 704/226
   See application file for complete search history.

(56) References Cited

U.S. PATENT DOCUMENTS

| | | | | |
|---|---|---|---|---|
| 6,226,380 | B1 * | 5/2001 | Ding | H04B 3/23 379/413.01 |
| 6,363,344 | B1 * | 3/2002 | Higuchi | G10L 21/0208 379/388.04 |
| 6,442,275 | B1 * | 8/2002 | Diethorn | H04M 9/082 379/406.14 |
| 9,503,569 | B1 * | 11/2016 | Adams | H04M 3/002 |

\* cited by examiner

*Primary Examiner* — Md S Elahee
(74) *Attorney, Agent, or Firm* — Christensen O'Connor Johnson Kindness PLLC

(57) ABSTRACT

Apparatuses and Methods of double talk detection for echo suppression in the power domain are disclosed herein. An example method includes comparing a power echo estimate signal to a microphone power signal, determining if the power echo estimate signal is greater than or less than the microphone power signal by a first threshold, based on the power echo estimate signal being greater than or less than the microphone power signal by the first threshold, disabling adaptation of filter coefficients of an adaptive filter of an echo suppressor, and based on the power echo estimate signal not being greater than or less than the microphone power signal by the first threshold, enabling adaptation of filter coefficients of an adaptive filter of an echo suppressor.

21 Claims, 10 Drawing Sheets

DOUBLE TALK DETECTION FOR ECHO SUPPRESSION IN POWER DOMAIN

TECHNICAL FIELD

This disclosure relates generally to communication systems, and in particular but not exclusively, relates to double talk detection and echo suppression in communication signals.

BACKGROUND INFORMATION

Echo cancellation and echo suppression are methods of reducing echo in communication systems, such as telephony systems. They aim to improve signal quality by preventing echo creation or removing/reducing it after it has become present. The methods may also be referred to as acoustic echo cancellation (AEC) and acoustic echo suppression (AES). Acoustic echo may be generated due to sounds from a speaker being reflected and recorded by a microphone, while line echo, which may also be present, is based on reflections occurring in the communication system itself. In general, the goal of AEC and AES is to prevent a speaking individual from hearing an echo of their own speech.

AEC may operate by subtracting the echo from a signal that may be received by the speaker. AES, on the other hand, may detect a signal going in one direction and then insert an amount of loss into a line of the other direction. For example, an echo suppressor at a far-end of a communication system adds the loss when it detects a signal coming from a near-end of the communication system. The injected loss may prevent the speaker at the far-end from hearing their own voice by reducing the echo to imperceptible levels.

While AEC and AES may work as desired when two parties speak separately, periods of time when both parties speak concurrently may be a problem, however. Both parties speaking concurrently may be referred to as double talk. If AEC and/or AES is performed during periods of double talk, there is a chance that all speech is either eliminated or suppressed so that neither party is heard. Many techniques have been employed to implement AEC and/or AES during periods of double talk. However, some of these methods may not entirely cancel or suppress echo during double talk, or even appropriately detect double talk. As such, robust double talk detection may be desired when implementing AES.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1:
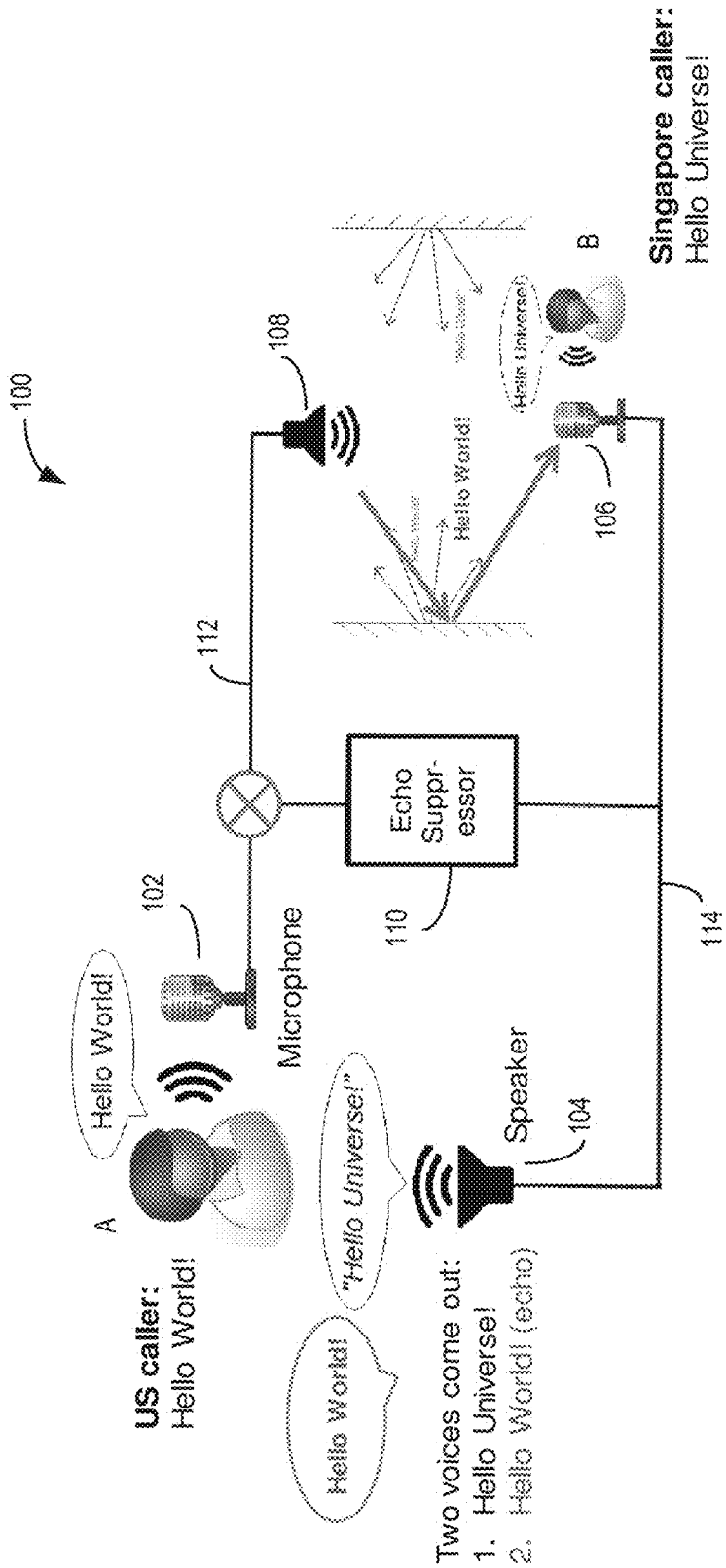
FIG. 1 is an illustrative communication system 100 in accordance with an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for double talk detection and echo suppression in a communication system are disclosed herein. In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

FIG. 1 is an illustrative communication system 100 in accordance with an embodiment of the present disclosure. The communication system 100 may include individual A, labeled as "US caller," communicating with individual B, labeled as "Singapore caller." The two individuals may be talking over a phone system, which may be internet protocol based phone system, a conventional phone system, or a combination thereof. The communication system 100 may have associated microphones and speakers for each individual. For example, individual A may have a microphone 102 and a speaker 104, whereas individual B may have microphone 106 and speaker 108. The communication system 100 may further include an echo suppressor 110 coupled to lines 112 and 114. The echo suppressor 110 may adjust the gain of the communication system 100 for one or more sub-bands of speech to reduce echo to imperceptible levels to individuals A and/or B. Additionally, during instances of double talk, e.g., times when both individuals A and B are talking, the echo suppressor 110 may stop, e.g., disable, adapting filter coefficients of an adaptive filter of the echo suppressor 110 to avoid negatively affecting the speech or individual A and/or B.

As shown in FIG. 1, without echo suppressor 110, individual A may hear an echo of Hello World, which was spoken by individual A. Hello World may be an acoustic echo of individual A's speech bouncing around the room of individual B that is picked up my microphone 106, and returned to individual A. Additionally, it may also be possible for individual B to receive an echo of Hello Universe from the microphone 102 of individual A. The echo received and heard by both individuals A and B may be annoying and/or make the speech of the other individual unintelligible.

To combat the echo, the echo suppressor 110 may include a dynamic adaptive filter coupled to multiply the lines 112 and 114 of the communication system 100 by a gain value to suppress the echo. The echo suppressor 110 may also be referred to as an acoustic echo suppressor (AES). The gain value may range from 0 to 1, for example, and may be applied to the entire frequency spectrum of the speech, or to one or more sub-bands of the frequency spectrum. The spectrum of the speech or one or more sub-bands may be multiplied by the gain to suppress the echo to levels imperceptible by individuals A and B, e.g., to reduce the echo of each speaker from hearing their own speech. In some embodiments, each sub-band may be processed separately and multiplied by a respective gain value. Yet, as noted above, the echo suppressor 110 may not desirably adapt filter coefficients during instances of double talk to prevent the filter coefficients from adapting to the near-end speech instead of the echo.

In some embodiments, the echo suppressor 110 may perform one or more algorithms on the speech and a reference input to determine whether double talk is occurring. The reference input may be a model or estimate of potential echo. For example, echo suppressor 110 may use "Hello World!" as reproduced by speaker 108 as the reference to suppress echo when individual A is speaking. In some embodiments, the echo suppressor 110 may use the power of a microphone signal, e.g., the speech input, and the power of the reference signal, e.g., an estimate of the echo, to determine whether double talk is occurring, and also to adjust filter coefficients of the echo suppressor 110. For example, a simple power calculation may be performed on the microphone input and the estimated echo by squaring the absolute amplitude values of the two signals. The reference or echo signal may be the Hello World echo received by the microphone 106, for example.

To determine whether double talk is occurring, the echo suppressor 110 may compare the power of the microphone signal to the power of the estimated echo signal to determine if they are different by a first threshold, where the power estimated echo signal may be obtained by filtering the reference signal power using the adaptive filter of the echo suppressor 110. In some embodiments, the comparison may be made for different frequency sub-bands. If the two signals are different by the first threshold, then that may indicate that double talk is detected, and filter coefficients of the adaptive filter of the echo suppressor 110 may not be adapted, at least while double talk is present. If, however, the two signals are not different by the first threshold, then double talk may not be occurring and adaptation of the adaptive filter coefficients may be performed by the echo suppressor 110.

Additionally, and if double talk is not occurring, the echo suppressor 110 may determine if the two signals differ by a second threshold. If so, then the echo suppressor 110 may be reset, e.g., coefficients of the adaptive filter reset, because divergence of the echo suppressor 110 may be indicated by the two signals differing by the second threshold. In some embodiments, the first threshold is greater than the second threshold. The process of determining whether double talk is occurring and adjusting filter coefficients, if necessary, may periodically occur during a conversation between individuals A and B. For example, the process may repeat every frame, which may be 10 to 30 milliseconds in length.

Figure 2:
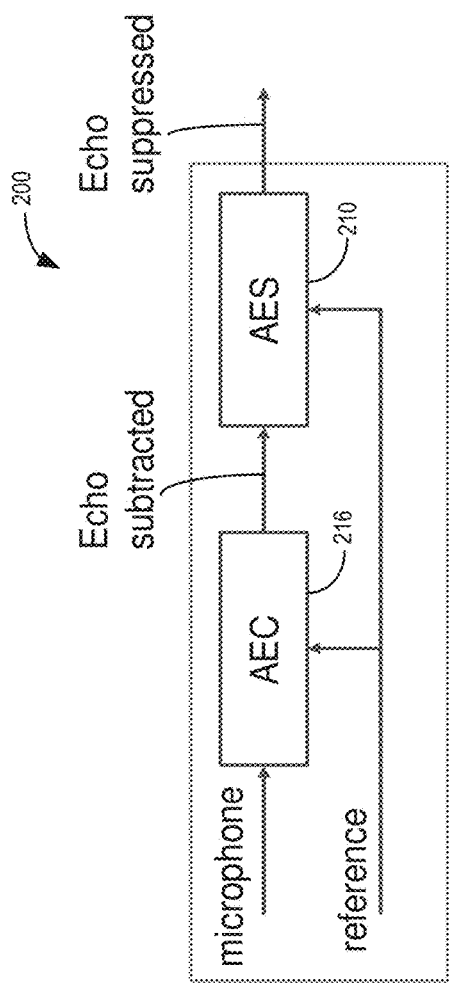
FIG. 2 is an example block diagram of a communication system 200 in accordance with an embodiment of the present disclosure.

FIG. 2 is an example block diagram of a communication system 200 in accordance with an embodiment of the present disclosure. The communication system 200 is one example of the communication system 100. The illustrated embodiment of the communication system 200 includes an acoustic echo canceller (AEC) 216 and an acoustic echo suppressor (AES) 210. The AES 210 may be an example of the echo suppressor 110. While the communication system 200 includes both the AEC 216 and the AES 210, the AEC 216 may be omitted in some embodiments.

The AEC 216 may receive a microphone signal, e.g., speech of an individual, and a reference signal that may be a microphone signal from a receiving end. In response, the echo may be subtracted from the microphone signal. Similar to FIG. 1, the echo may be due to the received microphone speech being picked up by a microphone of the receiving end, which may be influenced by the surroundings of the microphone. The AEC 216 may include one or more adaptive filters to estimate the echo signal and cancel the estimated echo signal through subtraction. The echo subtracted signal may then be provided to the AES 210.

The AES 210 may receive the echo subtracted signal form the AEC 216 and further suppress any remaining echo. The AES 210 may suppress any remaining echo to imperceptible levels instead of cancelling the remaining echo, which may be implemented through multiplication instead of subtraction. For example, the AES 210 may multiply the echo subtracted signal with a gain value to obtain the desired level of echo suppression. In some embodiments, the AES 210 may determine if double talk is present, and suspend or disable adapting adaptive filter coefficients of the AES 210 when double talk is present. If double talk is not present, then the coefficients of the adaptive filter may be adapted to the speech.

Figure 3:
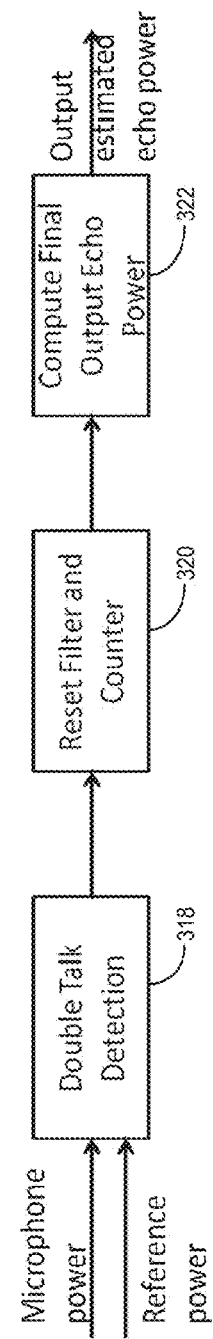
FIG. 3 is an example block diagram of an AES 310 in accordance with an embodiment of the present disclosure.

FIG. 3 is an example block diagram of an AES 310 in accordance with an embodiment of the present disclosure. The illustrated AES 310 may be one example of the echo suppressor 110 and/or the AES 210. The illustrated embodiment of the AES 310 includes a double talk detection module 318, a reset filter and counter module 320, and a compute final output echo power module 322. The AES 310 may be implemented in software, hardware, or a combination thereof. For example, the AES 310 may be implemented as one or more algorithms performed by a computer system, implemented by application specific integrated circuit(s), or a combination thereof. Additionally, while the modules 318, 320, and 322 are shown separate, in some embodiments, they may be combined into a single module. The separate depiction is for ease of discussion.

The AES 310 may receive two input signals, Microphone power and Reference power, and provide an Output estimated echo power signal in response. The Microphone power signal may be a near-end microphone signal converted into a power signal of the same by squaring the absolute values of the near-end microphone signal. The Reference power signal may be similarly determined based on the echo from a far-end microphone signal. The Output estimated echo power signal may be used to determine coefficients of an adaptive filter used to suppress the echo of the reference signal, e.g., the far-end microphone signal. In some embodiments, the two input signals may be split into different sub-bands of their respective spectrums and processed separately. Of course, the entire bandwidth of the Reference power and Microphone power signals may be used simultaneously. However, breaking the bandwidth into sub-bands may simplify the echo suppression and allow for fast parallel processing.

In some embodiments, the double talk detection module 318, which may initially receive the two input signals, may implement an algorithm to determine if double talk is occurring. For example, the double talk detection module 318 may determine if a power of an estimated echo is greater than or less than the Microphone power by a first threshold, where the power of the estimated echo is based on the Reference power signal. For example, the power of the estimated echo may be determined by filtering the Reference power signal by an adaptive filter of the AES 310. In some embodiments, the first threshold may be predefined, else it could be dynamic. An example first threshold may be 3 dB. The double talk detection module 318 may perform the analysis periodically, such as once every frame, where a frame is 10 to 30 msecs long. If the determined difference is outside of the first threshold, then double talk is likely occurring and the filter coefficients of the adaptive filter of the AES 310 may not be adapted, at least during that frame. Additionally, if the difference is outside of the first threshold, then coefficients of an adaptive filter of the AES 310 (not shown) may be reset, and a counter may be zeroed, which maybe performed by module 320. The counter may keep track of the number of frames the difference is within the first threshold. If, on the other hand, the power of the estimated echo is within the first threshold of the Microphone power, then double talk is likely not occurring and adaptation of the filter coefficients will be performed.

Subsequent to the double talk determination, the Microphone power signal and the estimated echo power signal may be received by the reset filter and counter module 320. The reset filter and counter module 320 may perform one or more subsequent algorithms to determine, among other things, whether the adaptive filter has diverged and correct for divergence. Divergence may be determined to have occurred if the difference between the Microphone power signal and the power of the estimated echo is greater than a second threshold, the second threshold being larger than the first threshold. An example of the second threshold may be 10 dB. If there is divergence, then the filter coefficients may be reduced, e.g., scaled down by a factor, and a counter may be reset. The counter may be increased by the double talk detection module 318 when a good estimate of the echo power is obtained by the adaptive filter, but reset if divergence occurs. If divergence is not detected, then the current filter coefficients are maintained and the AES 310 continues to operate accordingly.

The compute final output echo power module 322 may update the filter coefficients if divergence occurs, and new coefficients may be used to compute the final output echo power. Else, the previous coefficients are maintained and the AES 310 continues accordingly.

Figure 4:
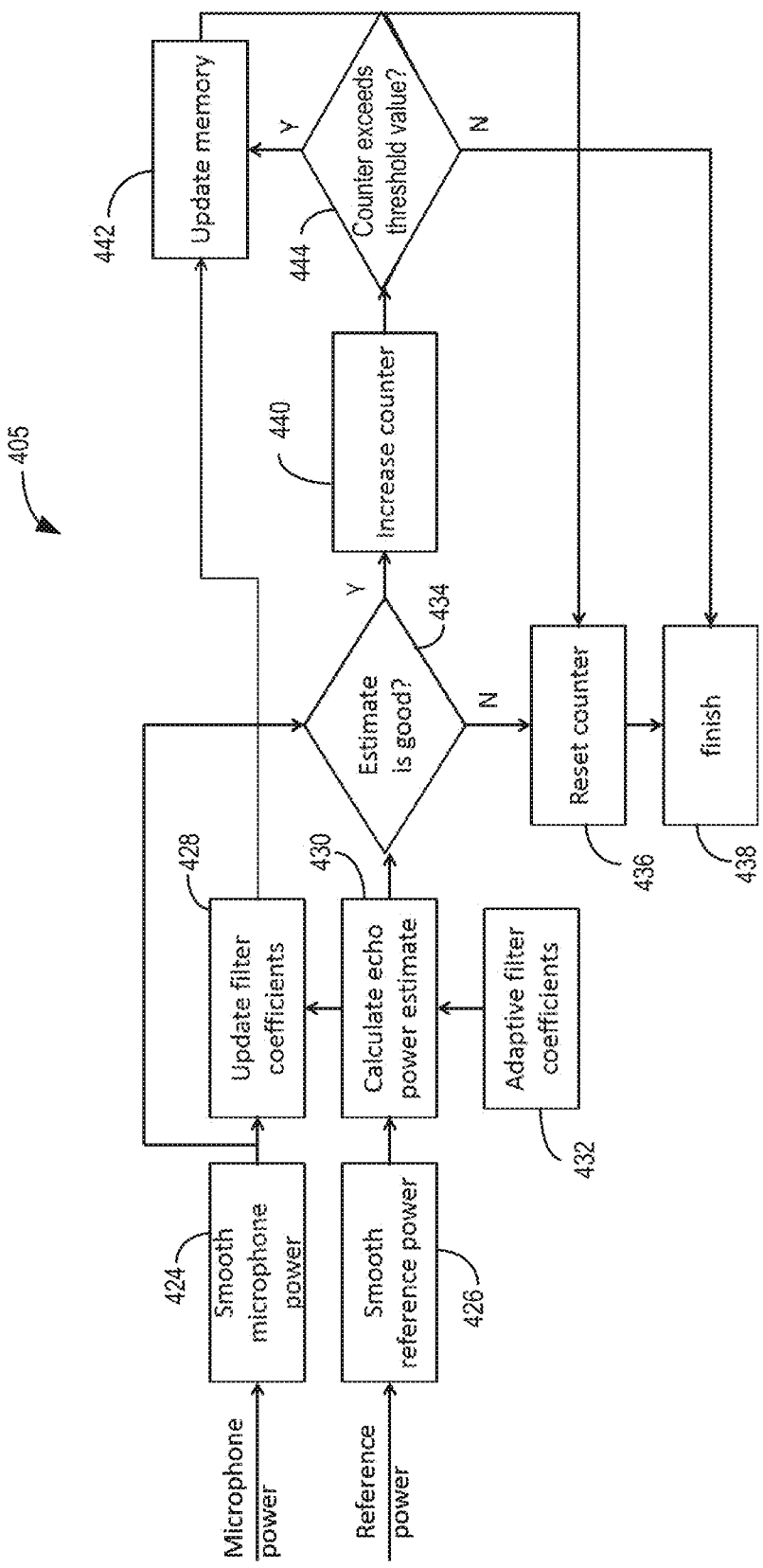
FIG. 4 is an example flow chart 405 for implementing double talk detection and echo suppression in accordance with an embodiment of the present disclosure.

FIG. 4 is an example flow chart 405 for implementing double talk detection and echo suppression in accordance with an embodiment of the present disclosure. The flow chart 405 may be an example algorithm implemented by the AES 110, 210 and/or 310. The flow chart 405 may determine whether double talk is occurring in a communication system, such as the communication system 100, and adapt filter coefficients when double talk is not detected, else adaptation of the filter coefficients may not be performed, at least until double talk is no longer occurring. In some embodiments, the flow chart 405 may be periodically implemented, such as at least once for each frame.

In some embodiments, a spectrum of the input signals Microphone power and Reference power may be divided into a plurality of sub-bands. Each sub-band may then be processed separately. Accordingly, the algorithm(s) of the flow chart 405 may be performed on each sub-band individually and in parallel. Only a single sub-band will be used in the discussion of the flow chart 405, but the discussion should not be considered limiting. Prior to the implementation of the flow chart 405, a microphone signal, e.g., near-end speech, and a reference signal, e.g., output of a far-end speaker that may provide an echo signal, may be converted into respective power signals, as previously discussed. The power signals may then be divided into a plurality of sub-bands, with the sub-bands processed by a respective AES, for example.

For a single sub-band, the Microphone power and the Reference power signals may first be received by respective smoothing blocks 424 and 426. The Microphone power signal may be received by the Smooth microphone power block 424, while the Reference power signal may be received by the Smooth reference power block 426. Both of the blocks 424 and 426 may remove large fluctuations in their respective power signals. The large fluctuations may be removed using a first order infinite impulse response (IIR) filter, for example. Though, other types of filters may also be implemented.

An Adaptive filter coefficients block 432 may include/store coefficients to use for an adaptive filter implemented by blocks of the flow chart 405. The coefficients may be updated, changed, zeroed, rescaled, etc. by the AES in response to analysis performed by the algorithm of the flow chart 405. The Adaptive filter coefficients 432 may be used by an adaptive filter implemented in blocks 428 and/or 430 when determining a profile of the Reference signal, e.g., estimated echo power signal, and filtering the Microphone power signal. For example, the Calculate echo power estimate block 430 may include an adaptive filter that uses the coefficients from the Adaptive filter coefficients block 432 to determine an estimate of the echo power signal based on the Reference power signal. An output of the Calculate echo power estimate block 430 may be provided to the Estimate is good decision block 434. The output of the Calculate echo power estimate block 430 may be an estimate of the echo power signal.

The Smooth microphone power block may be followed by an Update filter coefficients block 428, and the Estimate is good decision block 434. The Update filter coefficients block 428 may include an adaptive filter for filtering noise from the Microphone signal. In some embodiments, the adaptive filter may be based on a least means squares method. The adaptive filter may use the coefficients provided by the Adaptive filter coefficients block 432, which may update previous filter coefficients. An output of the Update filter coefficients block 428 may be provided to an update memory block 434. Additionally, the output of the Smooth microphone power block 424 may be provided to the Estimate is good decision block 434.

The Estimate is good decision block 434 may compare the Microphone power signal to the estimated echo power signal and determine if the comparison is good. In some embodiments, if the difference is less than a first threshold, then the estimate is determined to be good. An example first threshold may be 3 dB, but other values may be implemented. In some embodiments, the estimate may determine whether double talk is occurring. For example, if the estimated echo power signal is greater than or less then the Microphone power by 3 dB, then there is a high likelihood that double talk is occurring, e.g., both parties of a call are simultaneously talking. So, if the estimate is not good, e.g., double talk is occurring, then the algorithm proceeds to Reset counter block 436. If, however, the estimate is good, e.g., double talk is not occurring, then the algorithm proceeds to Increase counter block 440. The increase counter block 440 may increment for every iteration during a frame that the outcome of the Estimate is good decision block 434 is good.

The algorithm may proceed to a Counter exceeds threshold value decision block 444 from the Increase counter block 440. The Counter exceeds threshold value decision block 444 may determine if the count held by a counter has exceeded a threshold value. If so, then the algorithm may proceed to the Update memory block 442. If not, then the algorithm may proceed to finish block 438. The counter exceeding the threshold value may indicate that the coefficients have been good for a desired amount of time, e.g., counts during a frame, and they will likely remain that way until a subsequent frame and a subsequent iteration of the algorithm. As such, the Update memory block 442 may store the current filter coefficients in memory. The stored coefficients may also be accessed and used by the Adaptive filter coefficients block 432. After the coefficients are stored by the update memory block 442, the algorithm may proceed to the finish block 438.

As noted above, if the estimate is not good, e.g., if double talk is occurring, then the algorithm proceeds to Reset counter block 436 from the Estimate is good decision block 434. The Reset counter block 436 may zero the counter so the process of convergence of the adaptive filter on good coefficients may restart. After the counter is reset by Reset counter block 436, the algorithm proceeds to the finish block 438. The finish block 438 may end a single occurrence of the algorithm implementing the flow chart 405.

Figure 5:
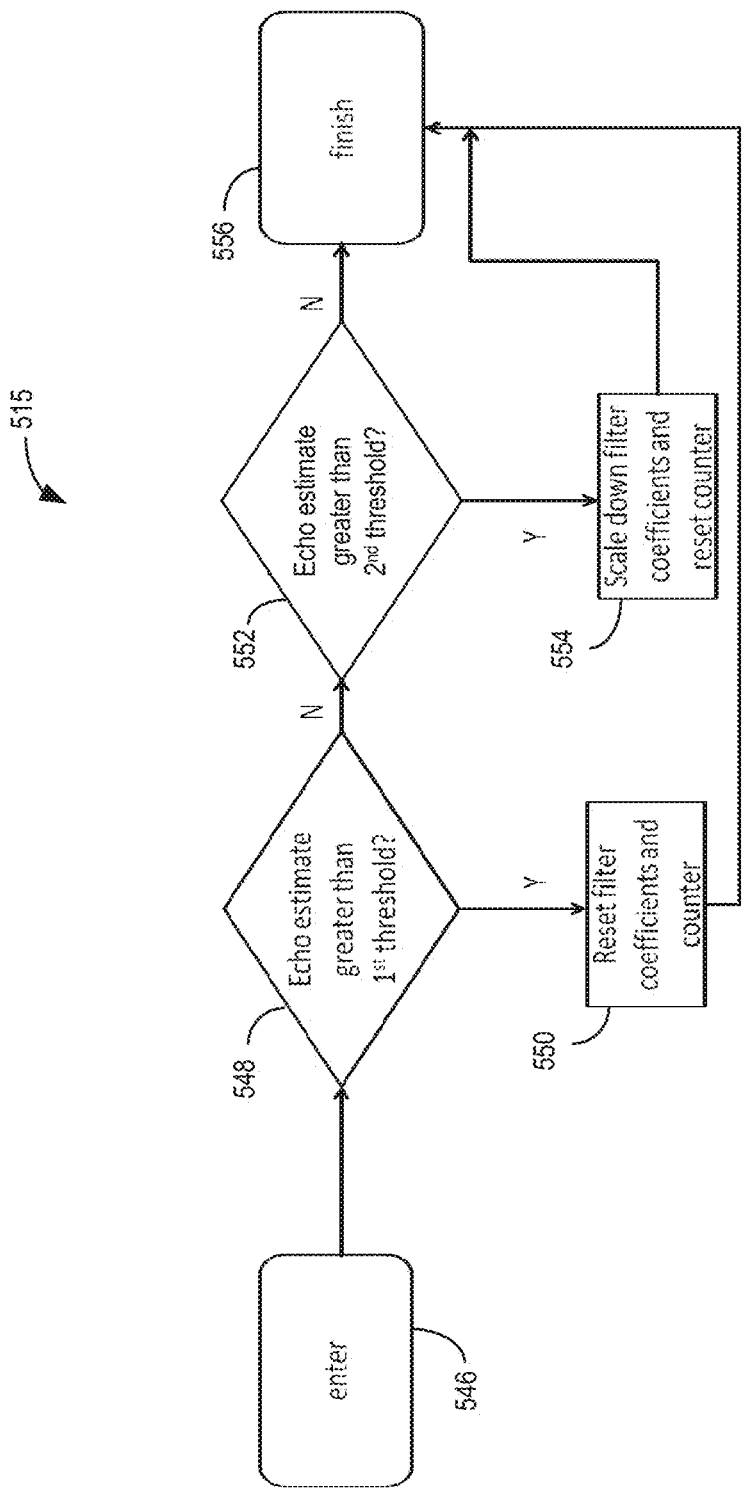
FIG. 5 is an example flow chart 515 implemented by an AES in accordance with an embodiment of the present disclosure.

FIG. 5 is an example flow chart 515 implemented by an AES in accordance with an embodiment of the present disclosure. The flow chart 515 may be an example of the reset filter and counter block of AES 310, and portions of the flow chart 405. However, the flow chart 515 may be implemented by any of the AESs 110, 210 and/or 310. The flow chart 515 may represent an algorithm for determining if double talk is occurring and for further determining if divergence of an adaptive filter has occurred. If either are true, then the algorithm may cause adjustments and/or resetting to coefficients of the adaptive filter of the AES. For example, the coefficients of the adaptive filter may be scaled down or reset to a base value.

Initiation of the algorithm may occur in enter block 546 with entrance of the flow chart 515. In some embodiments, the algorithm shown by flow chart 515 may begin once every frame, for example, and may include receiving a Microphone power signal and a Reference power signal by an AES included in a communication system, such as the communication system 100.

Subsequent to enter block 546 is the Echo estimate greater than first threshold decision block 548. The decision block 548 may determine if the echo estimate is greater than the Microphone power signal by the first threshold, and may be analogous to the estimate is good decision block 434. In some embodiments, the first threshold may be 10 dB. The echo estimate may be, for example, the output of the Calculate echo power estimate block 430 of FIG. 4. Accordingly, the echo estimate may be an echo estimate power signal based on a Reference signal. If the echo estimate is less than a threshold greater than the Microphone power signal, then the algorithm proceeds to block 552. If, however, the echo estimate is greater than the Microphone power signal by the first threshold, then the algorithm proceeds to block 550. In some embodiments, the block 548 may determine if the echo estimate is less than or greater than the Microphone power signal by the first threshold.

If the echo estimate is greater than the Microphone power, then the algorithm proceeds to Reset filter coefficients and counter block 550. The block 550 may cause the algorithm to reset the adaptive filter coefficients to a base value or zero the coefficients. As such, the adaptive filter may be reset to an initial state. Additionally, a counter that counts a number of times the echo estimate is within the first threshold of the Microphone power signal may also be reset to zero. Resetting the counter allows the algorithm to start over.

If the echo estimate is not greater than the Microphone power by the first threshold, then the algorithm proceeds to the Echo estimate greater than second threshold decision block 552. The block 552 determines if echo estimate is greater than the Microphone power signal by the second threshold, and if so, the algorithm proceeds to block 554. If not, however, the algorithm proceeds to block 556. In some embodiments, the second threshold is 3 dB. In some embodiments, block 552 determines if the echo estimate is less than or greater than the Microphone power signal by the second threshold. Block 552 may, in general, determine if there is convergence or divergence of the adaptive filter. If, for example, the echo estimate is greater than the Microphone power signal by the second threshold, then there may be divergence. If, however, the difference between the two signals is less than the second threshold, then there may not be divergence, and instead convergence may be obtained.

If the echo estimate is greater than the Microphone power signal by the second threshold, then the algorithm proceeds to the Scale down filter coefficients and reset counter block 554. In response to moving into block 554, the algorithm may reduce the filter coefficients, such as by 10, for example, and reset the counter. If the echo estimate is not greater than the Microphone power signal by the second threshold, then the algorithm proceeds to finish block 556, which ends the flow chart 515. Additionally, once the algorithm has completed blocks 550 or 554, the algorithm proceeds to the finish block 556. After the finish block 556 is executed, the algorithm may be subsequently performed using reset filter coefficients, scaled down coefficients, or unchanged coefficients.

Figure 6A:
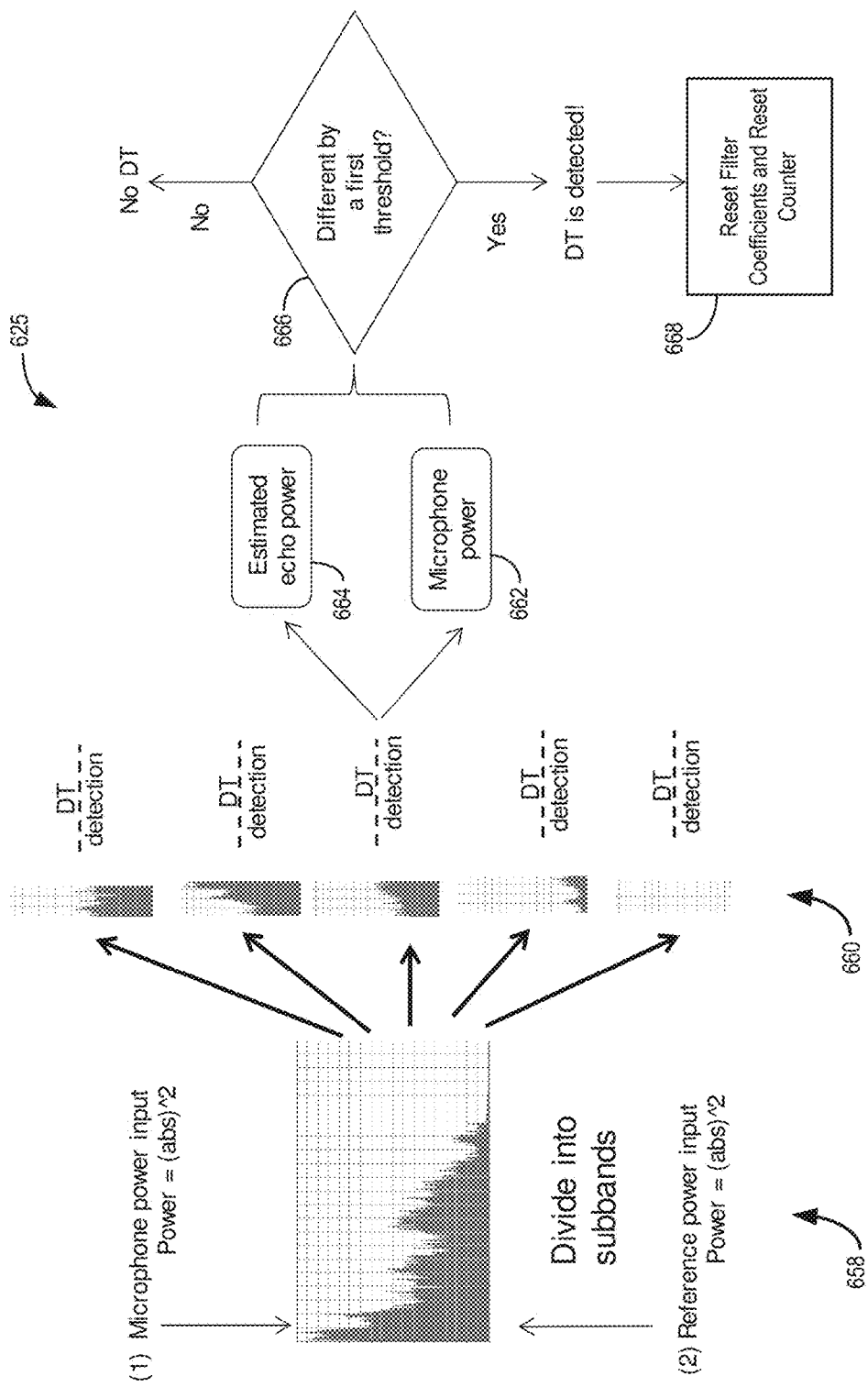
FIG. 6A is an example flow chart 625 in accordance with an embodiment of the present disclosure.

FIG. 6A is an example flow chart 625 in accordance with an embodiment of the present disclosure. The flow chart 625 may be an example of blocks 434 and 440 of FIG. 4, and may be implemented by a communication system that includes an AES, such as communication system 100 and AES 110, 210 and/or 310. The flow chart 625 may determine if double talk is occurring and proceed accordingly based on the determination.

A plot 658, shown on the left side of FIG. 6A, includes the spectral profile of a Microphone power signal and a Reference power signal. The two signals were obtained, as discussed previously, by squaring their absolute amplitude values. The spectral response of each may then be sub-divided into smaller bands, as shown by partial plots 660. After sub-division of the spectral profiles, each sub-band may be operated on separately by an echo suppression algorithm, as outlined by the flow chart 625.

Each sub-band may have an Estimated echo power signal, as shown in block 664, and a Microphone power signal, as shown in block 662. The two sub-band signals may then be compared in decision block 666, which determines whether the two signals are different by a first threshold, 10 dB for example. If they are not, then the algorithm determines that double talk may not be occurring. If, however, the two signals are different by the first threshold, then the algorithm proceeds to block 668. In block 668, the algorithm is directed to reset the filter coefficients and reset a counter. In some embodiments, resetting the filter coefficients and the counter may stop the adaptive filter from adapting, at least during that frame. As discussed above, the counter is tracking the number of times the determination of decision block 666 is good, e.g., when the two signals are not different by the first threshold.

Figure 6B:
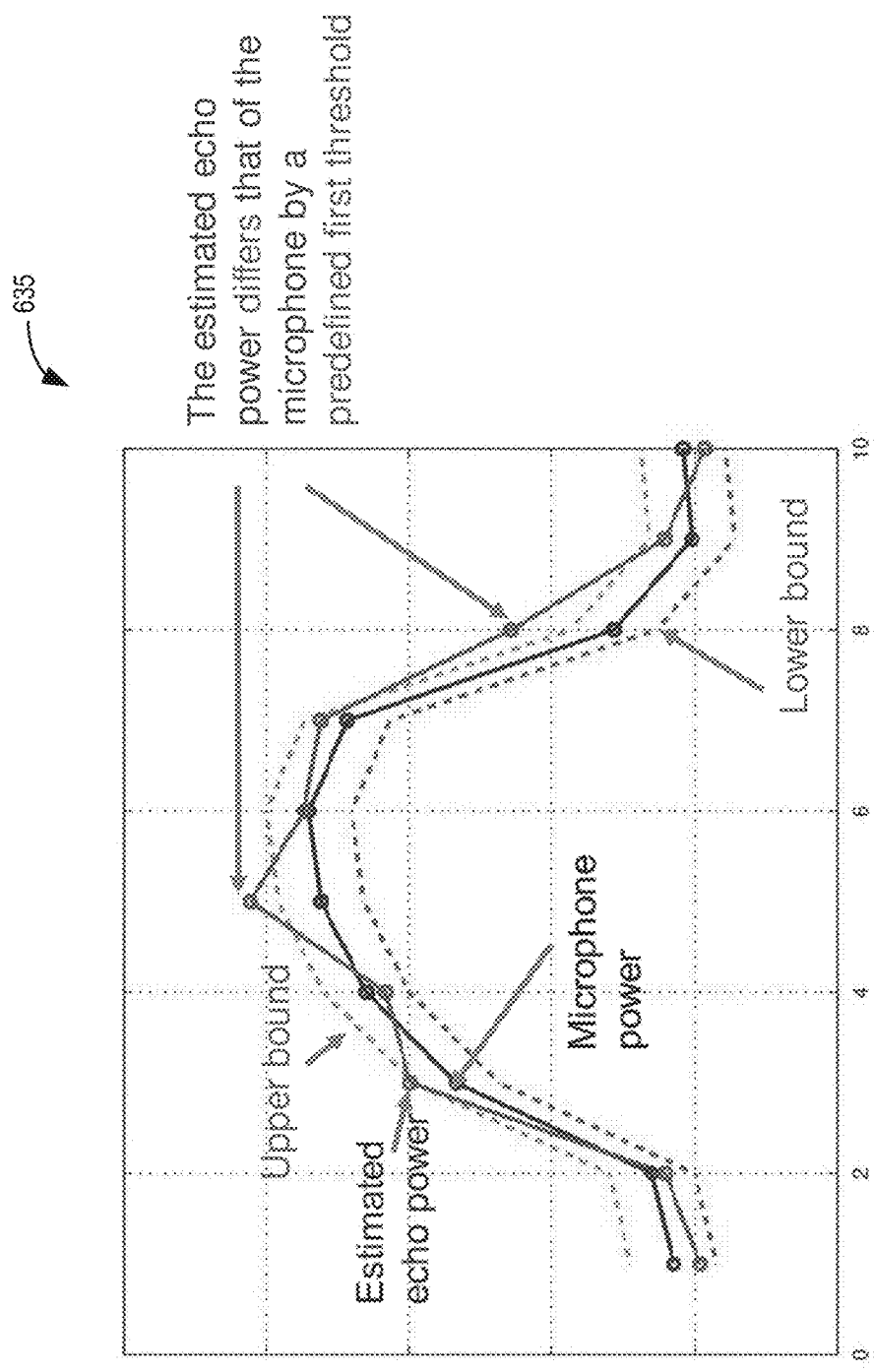
FIG. 6B is an example plot 635 in accordance with an embodiment of the present disclosure.

FIG. 6B is an example plot 635 in accordance with an embodiment of the present disclosure. The plot 635 shows an example estimated echo power signal and a Microphone power signal plotted together along with lines showing where the upper and lower bounds of the first threshold occur. The units are in dB for the y-axis and sub-band number for the x-axis. The plot 635 may represent an entire spectral profile of an estimated echo power signal and a Microphone power signal with each point on the graph corresponding to a single sub-band.

The plot 635 shows that points 1 through 4, 6, 7, 9 and 10 that the difference between the estimated echo power signal and the Microphone power signal are within the first threshold. However, at points 5 and 8, the estimated echo is greater than the Microphone power signal by more than the first threshold. In embodiments where each point represents the analysis of flow chart 625 for a single sub-band, then the echo suppression algorithm may not be implemented for sub-bands corresponding to points 5 and 8 since double talk may be occurring. However, echo suppression may be implemented for sub-bands corresponding to the points 1 through 4, 6, 7, 9 and 10. In other embodiments, echo suppression may not be performed in any sub-band due to the presence of double talk.

As shown in the plot 635, the estimated echo power signal may be determined good, e.g., within the first threshold of the Microphone power signal, when the estimated echo power signal tracks the Microphone power signal. By tracking the Microphone power signal with the estimated echo signal, the suppression of any echo may be enough to limit its perceptibility.

Figure 7A:
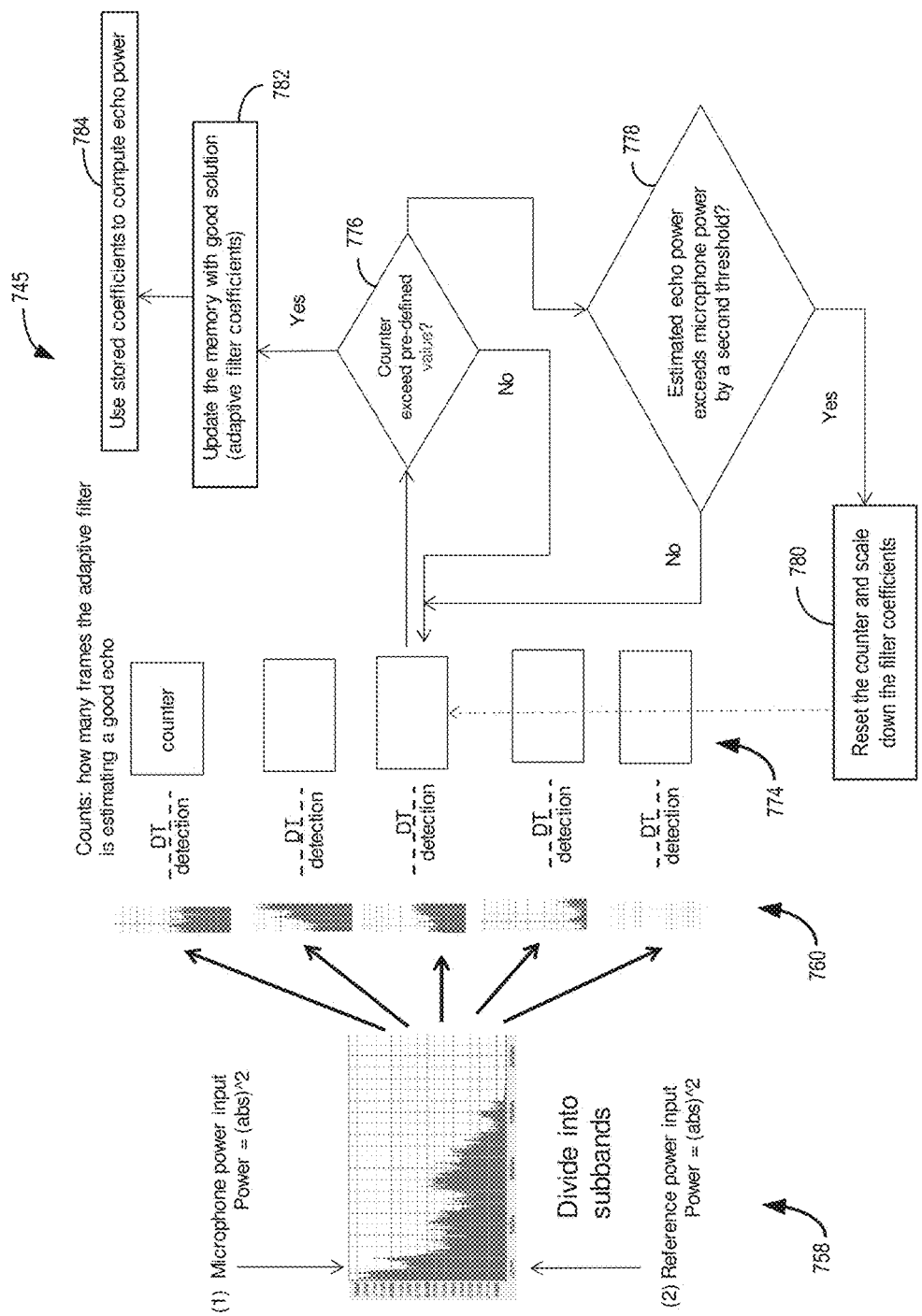
FIG. 7A is an example flow chart 745 for determining whether an adaptive filter is divergent in accordance with an embodiment of the present disclosure.

FIG. 7A is an example flow chart 745 for determining whether an adaptive filter is divergent in accordance with an embodiment of the present disclosure. The flow chart 745 may be an example of block 320 of FIG. 3. Similar to the flow chart 625, the Microphone power signal and the Reference power signal may be subdivided into smaller band-widths, which may be processed separately. For example, the plot 758 shows the spectral profile of the Microphone power signal and the Reference power signal, and sub-plots 760 show the divided sub-bands. Each sub-band may be processed separately by the algorithm shown by the flow chart 745.

A counter 774 associated with each sub-band may be increased for each determination that the echo estimate is good, e.g., that it is within a first threshold of the Microphone power signal. Subsequently, the decision block 776 may be performed by the algorithm. For example, decision block 776 may determine if a counter has exceeded a pre-defined value. If the counter has exceeded the pre-defined value, then the algorithm proceeds to block 782. Block 782 may cause the algorithm to update memory with the current filter coefficients, which are deemed to be good. Block 782 may be analogous to block 442 of FIG. 4. Subsequently, the algorithm may use the stored coefficients to compute the echo power in block 784.

If, however, the count has not exceeded the pre-defined value, then the algorithm continues to access the count value of the counters. In the meantime, the counters may be updated each time the algorithm performs the flow chart 625 and determines that the estimate is good.

Additionally, the algorithm may proceed to decision block 778 from block 776. Decision block 778 may cause the algorithm to determine if the estimated echo power exceeds the Microphone power by a second threshold, which may be 3 dB in some examples. If no, then the algorithm may continue to access the counters to determine their count value. If yes, e.g., the estimated echo power may have exceeded the Microphone power by the second threshold, then the algorithm may reset the counters and scale down the filter coefficients.

Figure 7B:
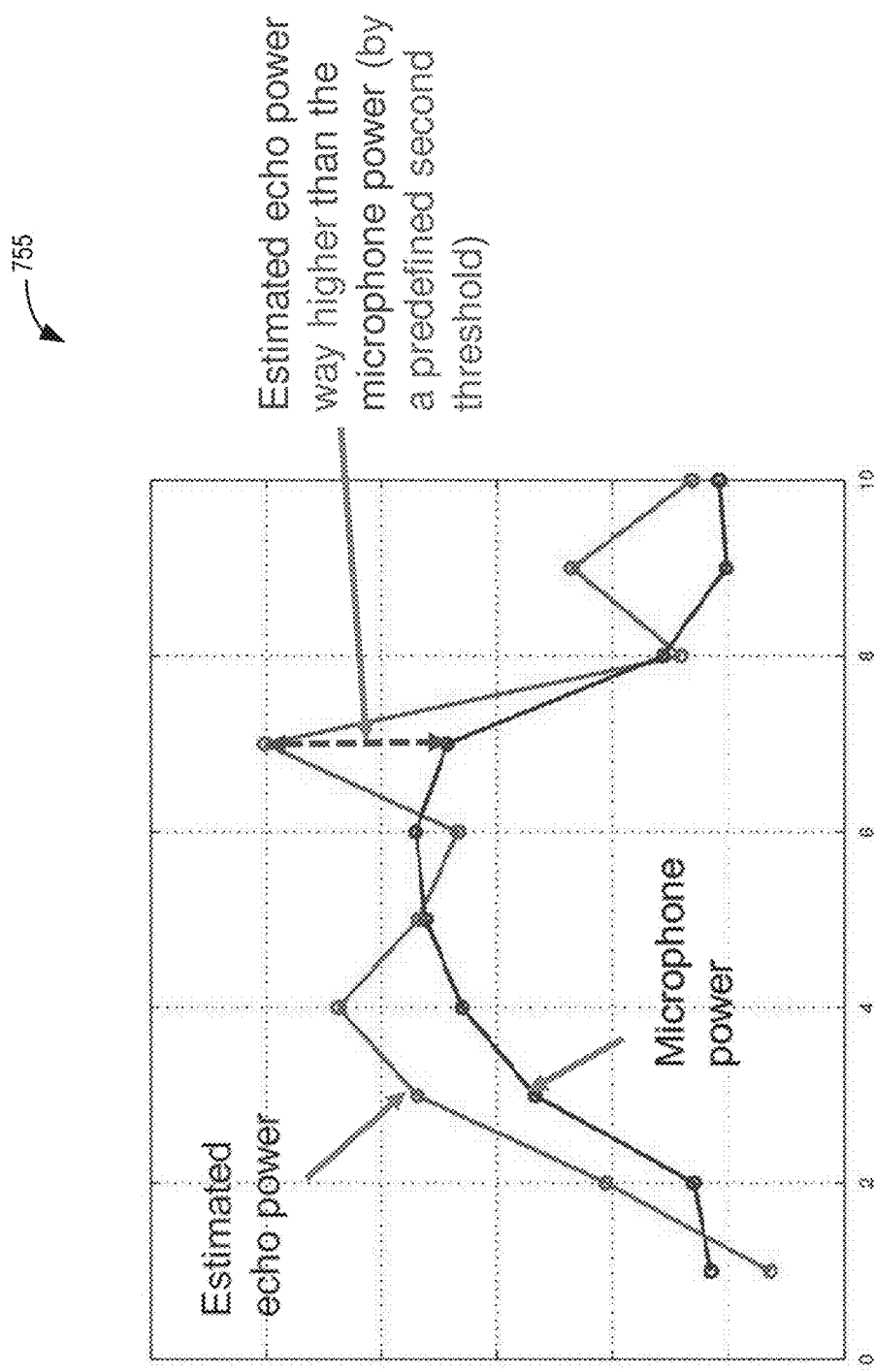
FIG. 7B is an example plot 755 in accordance with an embodiment of the present disclosure.

FIG. 7B is an example plot 755 in accordance with an embodiment of the present disclosure. The Plot 755 shows an example estimated echo power signal and a Microphone power signal plotted together. The units are in dB for the y-axis and sub-band number for the x-axis. The plot 755 may represent an entire spectral profile of an estimated echo power signal and a Microphone power signal with each point on the graph corresponding to a single sub-band.

The plot shows that the difference between the Microphone power signal and the Estimated echo power signal at points 1 through 6, 8 and 9 are less than the second threshold. However, at point 7 the difference between the Microphone power signal and the Estimated echo power signal is greater than the second threshold. As such, it may be determined that the adaptive algorithm has diverged at least within the sub-band associated with point 7, and that the filter coefficients associated with the sub-bands 1 through 6, 8 and 9 are good and should be used for echo suppression. As for the sub-band associated with point 7, the filter coefficients may be scaled down, by 10 for example, and the counters reset.

Figure 8:
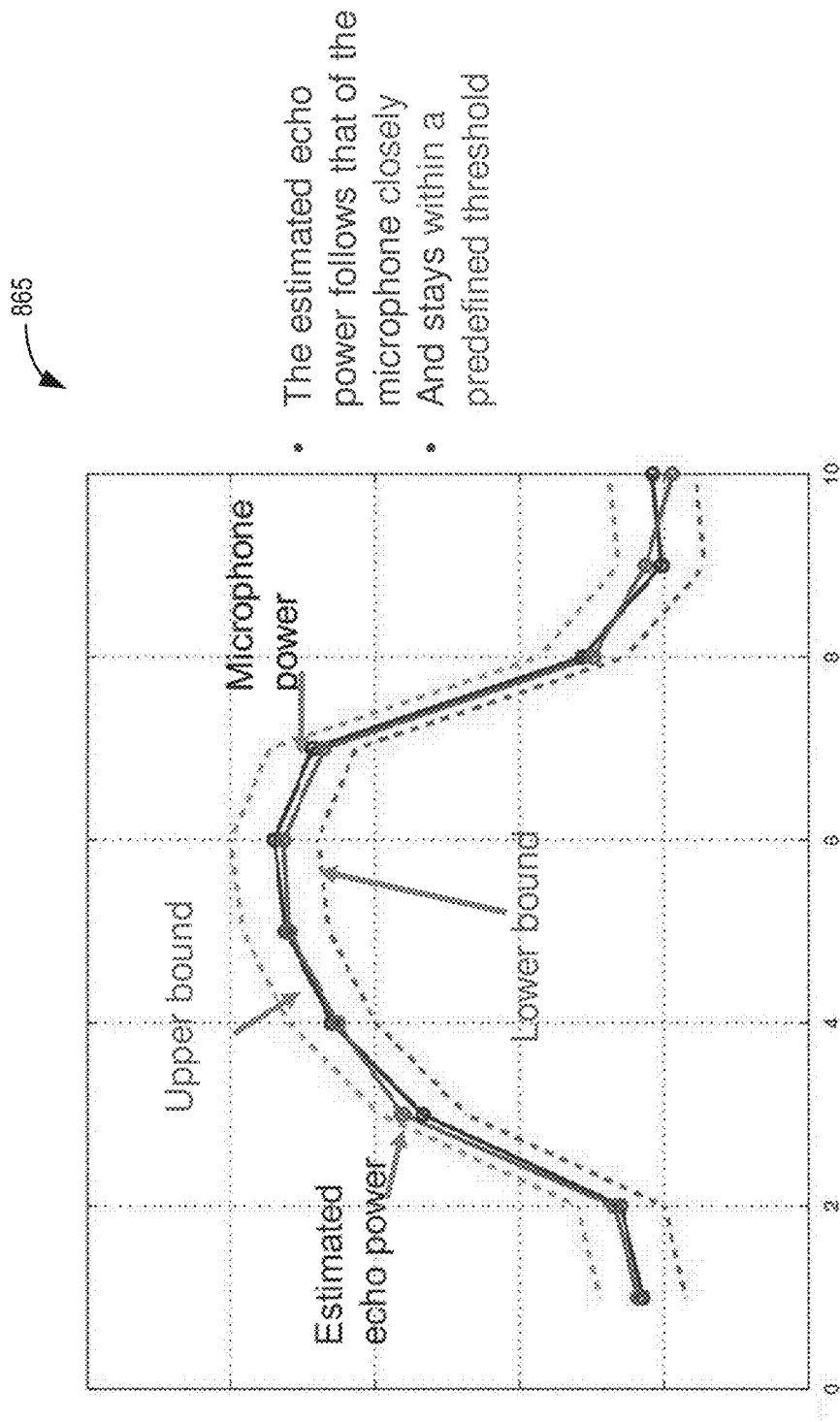
FIG. 8 is an example plot 865 in accordance with an embodiment of the present disclosure.

FIG. 8 is an example plot 865 in accordance with an embodiment of the present disclosure. The plot 865 shows an example of a good estimate echo power signal with no double talk. The plot 865 shows a Microphone power signal and an estimated echo power signal along with upper and lower bounds based on a first threshold. In some embodiments, the first threshold may be 3 dB. As shown, the estimated echo power signal closely follows the Microphone power signal, which is a desired outcome. Based on the closeness of the estimated echo power signal to the Microphone power signal, it may be determined that the current filter coefficients implemented by an adaptive filter of an echo suppressor are acceptable.

Figure 9:
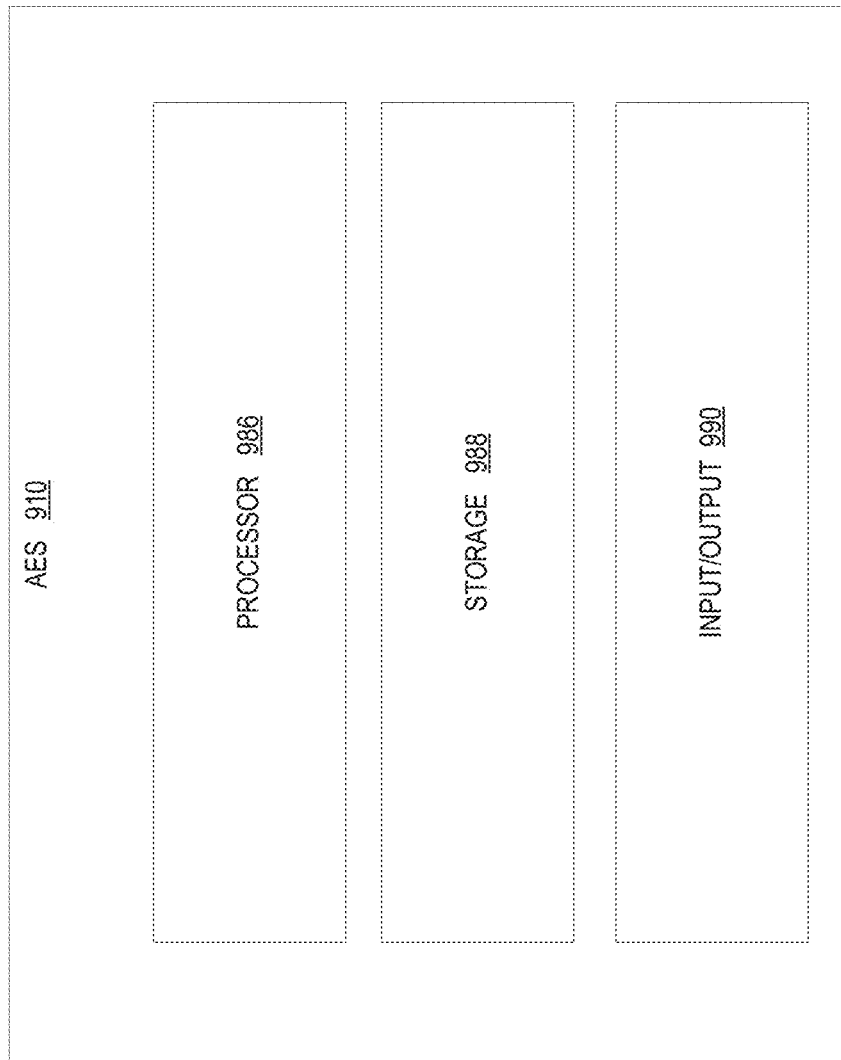
FIG. 9 is an example functional block diagram of an echo suppressor 910 in accordance with an embodiment of the present disclosure.

FIG. 9 is an example functional block diagram of an echo suppressor 910 in accordance with an embodiment of the present disclosure. The echo suppressor 910 may be an example of the echo suppressor 110, 210, and/or 310, and may be implemented by a communication system, such as the communication system 100. The echo suppressor 910 may suppress echo of near-end speech traveling back to the near-end speaker when double talk is not detected, but may not implement echo suppression when double talk is detected. The illustrated embodiment of the echo suppressor 910 may at least include a processor 986, storage 988, and input/output 990.

The input/output 990 may receive one or more signals and provide an echo suppression signal in response. The echo suppression signal may be injected into a channel from a far-end to a near-end to suppress any echo of the near-end originating speech. For example, the echo suppressor 910 may be coupled between lines 112 and 114 of the communication system 100 and inject echo suppression signals into line 114 to suppress echo of Hello World spoken by individual A. The echo suppression signal may be received from the processor 986, which may be implementing one or more algorithms discussed herein.

The storage 988 may store executable instructions for implementing the algorithms discussed herein used to perform echo suppression and double talk detection. The instructions may be executed by the processor 986 to determine if double talk is occurring, and to perform echo suppression when double talk may not be occurring. The storage 988 may be any type of memory, such as volatile or non-volatile memory.

The processor 986 may implement the echo suppression algorithms and provide echo suppression signals in response, and when double talk may not be occurring. The processor 986 may be a general purpose type processor or a system on a chip, for example. The processor may access the executable instructions in the storage 988 to implement the one or more algorithms for determining if double talk is occurring and for providing echo suppression when not. In some embodiments, the AES 910 may be implemented as software, hardware, or a combination thereof. For example, the AES 910 may be an application specific integrated circuit implementing firmware for providing the echo suppression and double talk determination.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A method comprising:
   smoothing a microphone power signal and a reference power signal to remove large fluctuations in the microphone power signal and the reference power signal;
   calculating a power echo estimate signal based on the reference power signal, after smoothing of the reference power signal;
   comparing the power echo estimate signal to the microphone power signal;
   determining if the power echo estimate signal is greater than or less than the microphone power signal by a first threshold;
   based on the power echo estimate signal being greater than or less than the microphone power signal by the first threshold, disabling adaptation of filter coefficients of an adaptive filter of an echo suppressor; and
   based on the power echo estimate signal not being greater than or less than the microphone power signal by the first threshold, enabling adaptation of filter coefficients of an adaptive filter of an echo suppressor.

2. The method of claim 1, further comprising:
   increasing a counter based on the power echo estimate signal not being greater than or less than the microphone power signal by the first threshold.

3. The method of claim 2, further comprising:
   determining if the counter exceeds a first value; and
   based on the counter exceeding the first value, updating a memory with current filter coefficients.

4. The method of claim 1, further comprising:
   based on the power echo estimate signal not being greater than or less than the microphone power signal by the first threshold, determining if the power echo estimate signal is greater than or less than the microphone power signal by a second threshold, the second threshold being less than the first threshold.

5. The method of claim 4, further comprising:
   based on the power echo estimate signal being greater than or less than the microphone power signal by the second threshold, scaling down the filter coefficients and resetting a counter of the echo suppressor.

6. The method of claim 4, further comprising:
   based on the power echo estimate signal not being greater than or less than the microphone power signal by the second threshold, using current filter coefficients.

7. The method of claim 1, wherein smoothing the microphone power signal and the reference power signal includes using a first order infinite impulse response filter to remove the large fluctuations.

8. An echo suppressor including non-transitory, computer readable medium including instructions that, when executed by one or more processors, causes the echo suppressor to:
   smooth a microphone power signal and a reference power signal to remove large fluctuations in the microphone power signal and the reference power signal;
   calculate a power echo estimate signal based on the reference power signal after smoothing of the reference power signal;
   compare the power echo estimate signal to the microphone power signal;
   determine if the power echo estimate signal is greater than or less than the microphone power signal by a first threshold;
   based on the power echo estimate signal being greater than or less than the microphone power signal by the first threshold, disable adaption of filter coefficients of an adaptive filter of the echo suppressor; and
   based on the power echo estimate signal not being greater than or less than the microphone power signal by the first threshold, enable adaption of filter coefficients of an adaptive filter of the echo suppressor.

9. The non-transitory, computer readable medium of claim 8, further including instructions to disable adaption of filter coefficients of an adaptive filter of the echo suppressor that, when executed by the one or more processors, causes the echo suppressor to:

based on the power echo estimate signal being greater than or less than the microphone power signal by the first threshold, reset the filter coefficients and reset a counter, wherein the counter counts a number of times the power echo estimate signal is not greater than or less than the microphone power signal by the first threshold.

10. The non-transitory, computer readable medium of claim 8, further including instructions that, when executed by the one or more processors, causes the echo suppressor to:

increase a counter based on the power echo estimate signal not being greater than or less than the microphone power signal by the first threshold.

11. The non-transitory, computer readable medium of claim 10, further including instructions that, when executed by the one or more processors, causes the echo suppressor to:

determine if the counter exceeds a first value; and based on the counter exceeding the first value, update a memory with current filter coefficients.

12. The non-transitory, computer readable medium of claim 8, further including instructions that, when executed by the one or more processors, causes the echo suppressor to:

based on the power echo estimate signal not being greater than or less than the microphone power signal by the first threshold, determine if the power echo estimate signal is greater than or less than the microphone power signal by a second threshold, the second threshold less than the first threshold.

13. The non-transitory, computer readable medium of claim 12, further including instructions that, when executed by the one or more processors, causes the echo suppressor to:

based on the power echo estimate signal being greater than or less than the microphone power signal by the second threshold, scale down the filter coefficients and reset a counter; and based on the power echo estimate signal not being greater than or less than the microphone power signal by the second threshold, use current filter coefficients.

14. The non-transitory, computer readable medium of claim 8, further including instructions that, when executed by the one or more processors, causes the echo suppressor to:

divide the power echo estimate signal and the microphone power signal into a plurality of sub-bands; and determine if the power echo estimate signal is greater than or less than the microphone power signal by the first threshold in each of the plurality of sub-bands.

15. The non-transitory, computer readable medium of claim 14, further including instructions that, when executed by the one or more processors, causes the echo suppressor to:

smooth the microphone power signal after dividing the microphone power signal into the plurality of sub-bands.

16. A method comprising:

smoothing a microphone power signal and a reference power signal to remove large fluctuations in the microphone power signal and the reference power signal;

calculating an echo power estimate signal, based on the reference power signal, with first filter coefficients;

determining whether the echo power estimate signal is greater than or less than the microphone power signal by a first threshold;

based on the echo power estimate signal not being greater than or less than the microphone power signal by the first threshold, using the first filter coefficients for an adaptive filter of an echo suppressor; and based on the echo power estimate signal being greater than or less than the microphone power signal by the first threshold, resetting the first filter coefficients to second filter coefficients.

17. The method of claim 16, further comprising:

increasing a counter based on the echo power estimate signal not being greater than or less than the microphone power signal by the first threshold; and resetting the counter based on the echo power estimate signal being greater than or less than the microphone power signal by the first threshold.

18. The method of claim 17, further comprising:

determining if the counter exceeds a first value; and based on the counter exceeding the first value, update a memory with current filter coefficients.

19. The method of claim 18, further comprising:

resetting the counter after updating the memory with the current filter coefficients.

20. The method of claim 16, further comprising:

based on the echo power estimate signal not being greater than or less than the microphone power signal by the first threshold, determining whether the echo power estimate signal is greater than or less than a microphone power signal by a second threshold, the second threshold different than the first threshold.

21. The method of claim 20, further comprising:

based on the echo power estimate signal being greater than or less than the microphone power signal by the second threshold, scaling down the first filter coefficients and resetting a counter.

\* \* \* \* \*